United States Patent
Donehue

(10) Patent No.: US 7,401,572 B2
(45) Date of Patent: Jul. 22, 2008

(54) VIEW AROUND FLOW INDICATOR

(76) Inventor: Wade L. Donehue, 2475 Weeks St., League City, TX (US) 77473

( * ) Notice: Subject to any disclaimer, the term of this patent is extended or adjusted under 35 U.S.C. 154(b) by 0 days.

(21) Appl. No.: 11/365,253

(22) Filed: Mar. 1, 2006

(65) Prior Publication Data
US 2007/0204787 A1 Sep. 6, 2007

(51) Int. Cl.
*G01F 1/115* (2006.01)

(52) U.S. Cl. ............ 116/274; 116/264; 116/DIG. 7; 137/557

(58) Field of Classification Search ........... 116/273, 116/276, 274, 271, 284, 112, 204, 267, DIG. 7; 137/557, 551, 559
See application file for complete search history.

(56) References Cited

U.S. PATENT DOCUMENTS

| | | | | |
|---|---|---|---|---|
| 799,603 A * | 9/1905 | King | ............ | 116/274 |
| 1,385,717 A * | 7/1921 | Sams | ............ | 116/274 |
| 1,490,901 A * | 4/1924 | Hendricks, Jr. | ............ | 116/267 |
| 1,534,881 A * | 4/1925 | Stokoe | ............ | 116/112 |
| 2,097,535 A * | 11/1937 | Rugel et al. | ............ | 116/274 |
| 2,110,679 A * | 3/1938 | Robinson | ............ | 416/189 |
| 2,143,467 A * | 1/1939 | Allard | ............ | 415/209.4 |
| 2,520,869 A * | 8/1950 | Windsor | ............ | 116/273 |
| 3,095,138 A * | 6/1963 | Warnken | ............ | 416/190 |
| 4,101,874 A * | 7/1978 | Denison et al. | ............ | 116/204 |
| 4,474,209 A * | 10/1984 | Akhtarekhavari | ............ | 116/274 |
| 4,745,877 A * | 5/1988 | Chang | ............ | 116/274 |
| 6,386,196 B1 * | 5/2002 | Culton | ............ | 116/264 |
| 6,526,907 B1 * | 3/2003 | Donehue | ............ | 116/274 |

* cited by examiner

*Primary Examiner*—R. A. Smith
(74) *Attorney, Agent, or Firm*—John R. Casperson

(57) ABSTRACT

A view around flow indicator comprising a housing, a turbine wheel, a cylinder, and a visually perceptible pattern on the outside surface of the cylinder is disclosed. The housing has an inside surface defining a flow path. The inside surface of the housing forms a generally circumferentially extending annular recess. The turbine wheel comprises a hub positioned on the longitudinal axis, a ring positioned in the annular recess, a plurality of radially extending turbine blades connecting the hub with the ring, and plurality of magnets carried by the ring. The cylinder is mounted on an outside surface of the housing for rotation around the longitudinal axis of the flow path. The cylinder carries a plurality of magnets which are magnetically coupled to the plurality of magnets carried by the ring. The visually observable pattern on the outside surface of the cylinder permits rotation of the cylinder to be visually ascertained.

19 Claims, 4 Drawing Sheets

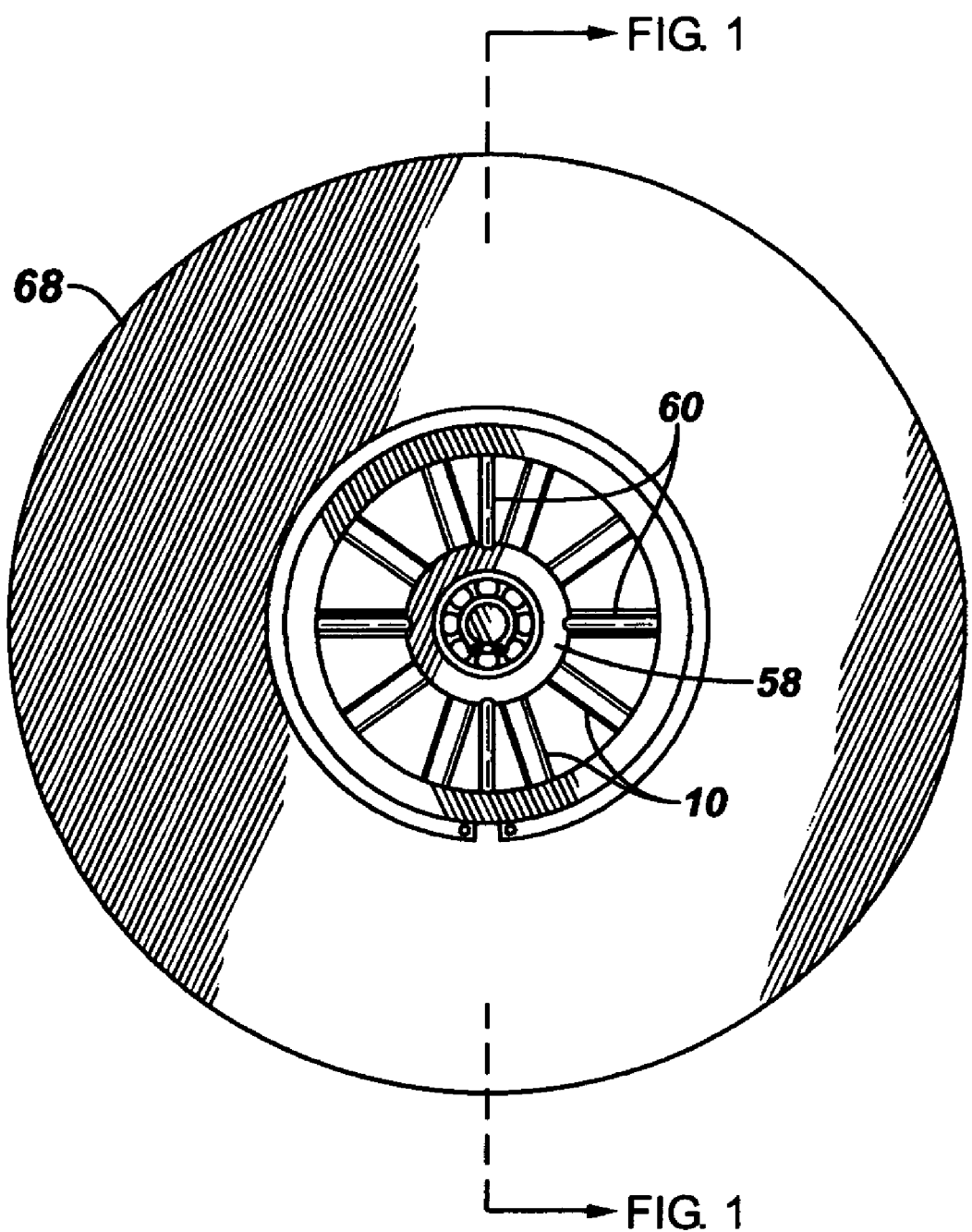

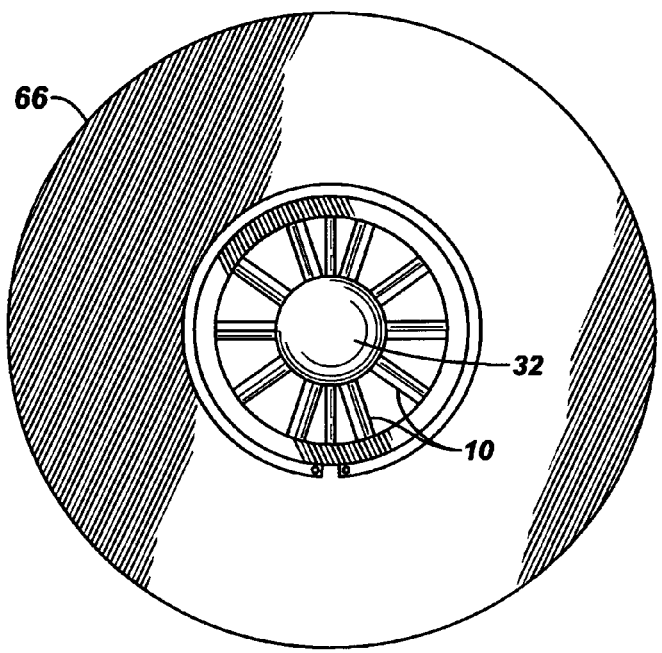
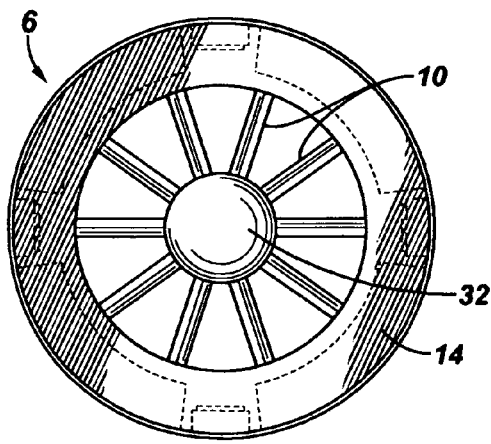
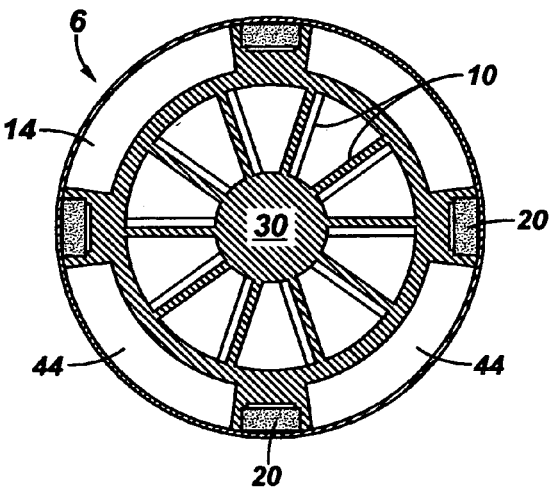

US 7,401,572 B2

VIEW AROUND FLOW INDICATOR

FIELD OF THE INVENTION

In one aspect, this invention relates to an improved device to provide an external visual indication of fluid flow within an opaque pipe.

BACKGROUND OF THE INVENTION

Determining whether fluid is flowing through a hard-walled opaque pipe can be important for a number of reasons. In the plant setting, a failure to make the correct determination can result in waste and/or destruction on a massive scale, personal injury, and death.

A device which enables one to visually ascertain from a distance whether fluid is flowing within pipe is described in my U.S. Pat. No. 6,526,907, issued Mar. 4, 2003. The disclosure of this patent is incorporated by reference herein. The patent discloses a flow indicating device which is highly visible, easy to read, and is viewable from any location around the pipe.

While this device is a noteworthy advance in the art, it has been possible to improve it in several areas, primarily from the standpoints of providing a lower pressure drop, less turbulence, greater ease of manufacturing, and improved performance particularly at low flow rates.

OBJECTS OF THE INVENTION

It is an object of this invention to provide an improved flow indicator which functions with a low pressure drop.

It is another object of this invention to provide an improved flow indicator which has a low stall speed.

It is another object of this invention to provide an improved flow indicator which is easy to manufacture.

SUMMARY OF THE INVENTION

One embodiment of the invention provides an improvement to a view-around flow indicator. The improvement is applicable to an apparatus comprising a tube, a turbine wheel in the tube, and a cylinder mounted outside of the tube which is magnetically coupled to the turbine wheel as so to give an indication of flow in the tube. The tube defines a flow path. The turbine wheel is mounted in the tube for rotation alongside an inside wall of the tube and is provided with a plurality of turbine blades. The cylinder is mounted outside the tube for rotation alongside an outside wall of the tube and is magnetically coupled to the turbine wheel through the sidewall of the tube so that rotation of the turbine wheel causes rotation of the cylinder. A visually observable pattern is provided on an outside surface of the cylinder so that rotation of the cylinder can be visually ascertained. The improvement comprises a ring mounted peripherally around the plurality of turbine blades and forming a part of the turbine wheel, and an annular recess formed in an inner wall of the tube for receiving the ring. The ring permits the mounting of larger magnets on the wheel for better coupling of the cylinder. Positioning the ring in the annular recess avoids unnecessarily restricting the flow path with the added structure on the turbine wheel.

In another embodiment of the invention, there is provided an apparatus comprising a housing, a turbine wheel, a cylinder, and a visually perceptible pattern on the outside surface of the cylinder.- The housing has an inside surface defining a flow path. The flow path has a longitudinal axis. The inside surface of the housing forms a generally circumferentially extending annular recess. The turbine wheel is mounted in the housing for rotation around the longitudinal axis of the flow path. The turbine wheel comprises a hub positioned on the longitudinal axis, a ring positioned in the annular recess, a plurality of radially extending turbine blades connecting the hub with the ring, and plurality of magnets carried by the ring. The cylinder is mounted on an outside surface of the housing for rotation around the longitudinal axis of the flow path. The cylinder carries a plurality of magnets which are magnetically coupled to the plurality of magnets carried by the ring. The visually observable pattern on the outside surface of the cylinder permits rotation of the cylinder to be visually ascertained.

A further embodiment of the invention provides an improved method for providing a visual indication of a flow of fluid through an opaque hard walled tube. The improvement is applicable to a method wherein a turbine wheel having a plurality of turbine blades is positioned in the tube for rotation alongside an inside wall of the tube. A cylinder is positioned on the outside of the tube for rotation alongside an outside wall of the tube. The cylinder is magnetically coupled to the turbine wheel through the sidewall of the tube so that rotation of the turbine wheel causes rotation of the cylinder. A visually observable pattern is provided on the outside surface of the cylinder so that rotation of the cylinder can be visually ascertained. The improvement comprises flowing the fluid through a diverging section of the tube just prior to flowing the fluid through the turbine wheel. Flowing the fluid through a diverging section provides a lower pressure drop than the prior art process.

BRIEF DESCRIPTION OF THE DRAWINGS

FIG. 2 is a back end view of the device as would appear from perspective lines 2-2 in FIG. 1.

FIG. 3 is a front end view of the device as would appear from perspective lines 3-3 in FIG. 1.

FIG. 4 is a front end view of an internal element of the device shown in FIG. 1.

FIG. 5 is a cross sectional view of the element shown in FIG. 4.

DETAILED DESCRIPTION OF THE INVENTION

Figure 6:
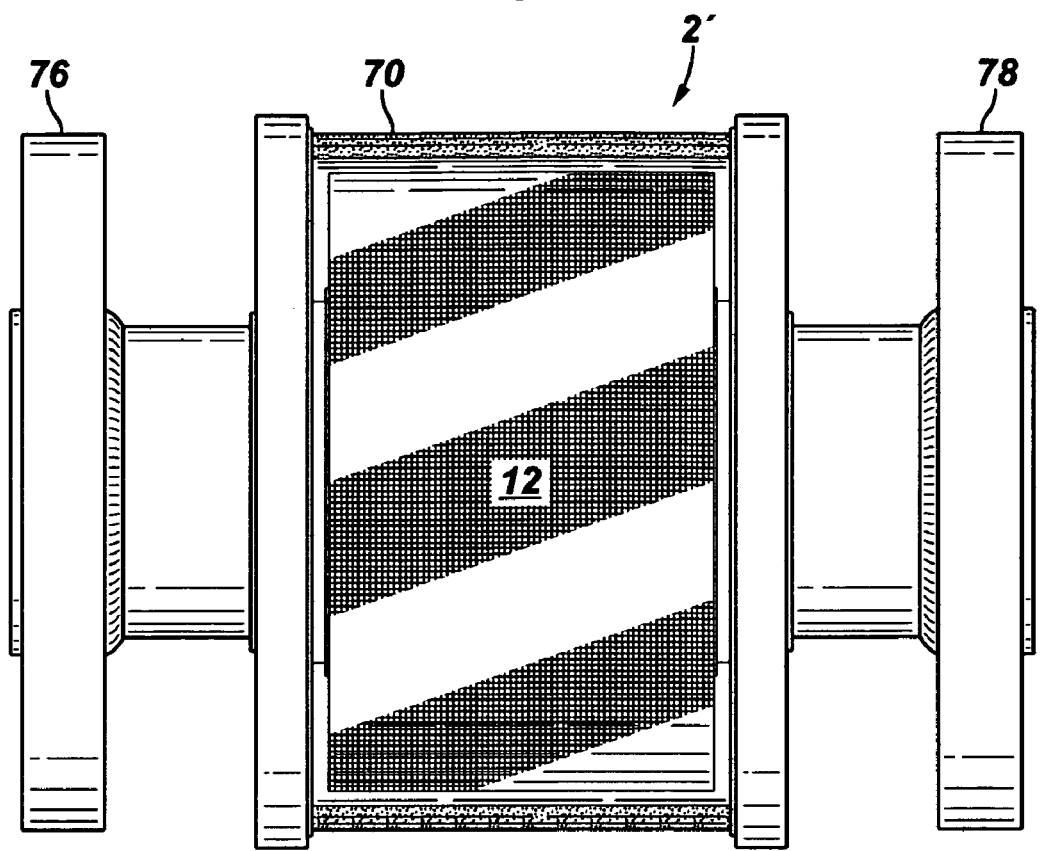
FIG. 6 is an external pictorial representation of a device as in FIG. 1 which has been provided with end flanges.

One embodiment of the invention provides an improved view-around flow indicator 2 (FIG. 6). The apparatus comprises a tube 4, a turbine wheel 6 in the tube, and a cylinder 8 mounted outside of the tube which is magnetically coupled to the turbine wheel as so to give an indication of flow in the tube. The tube defines a flow path for fluid flow as indicated by the arrows. The turbine wheel is mounted in the tube for rotation alongside an inside wall of the tube and is provided with a plurality of turbine blades 10. The cylinder is mounted outside the tube for rotation alongside an outside wall of the tube and is magnetically coupled to the turbine wheel through the sidewall of the tube so that rotation of the turbine wheel causes rotation of the cylinder. A visually observable pattern 12 (FIG. 6) is provided on an outside surface of the cylinder so that rotation of the cylinder can be visually ascertained. The improvement comprises a ring 14 mounted peripherally around plurality of turbine blades and forming a part of the turbine wheel, and an annular recess 16 formed in an inner wall of the tube for receiving the ring.

A plurality of magnets 18 are mounted to the cylinder. A plurality of magnets 20 are mounted to the ring. The magnets are mounted to the ring and to the cylinder so as to magnetically couple the turbine wheel to the cylinder.

Preferably, an upstream housing half 22 and a downstream housing half 24 come together to form the tube and define the annular recess. More preferably, a diverging flow path 26 is formed in the upstream housing half and a converging flow path 28 is formed in the downstream housing half. The turbine wheel is positioned between the converging flow path and the diverging flow path. The half-angle of convergence and the half-angle of divergence, as measured between the tube axis and the wall, is generally from 3 to 30 degrees, usually from 5 to 20 degrees.

A hub 30 forms a part of the turbine wheel. The hub has a longitudinal axis positioned along the longitudinal axis of the tube. The hub has an upstream end and a downstream end and the plurality of turbine blades extends radially outwardly from the hub. A nose cone element 32 is positioned on the upstream end of the hub. The nose cone element directs fluid flow against the turbine blades and also prevents or reduces a pressure bubble from forming in front of the turbine. Preferably, the nose cone element is generally hemispherically shaped. It is preferably cast as an integral part of the wheel assembly, which includes the hub, the shaft, the nose cone, the blades, and the ring.

Another embodiment of the invention comprises a housing 34, a turbine wheel 6, a cylinder 8, and a visually perceptible pattern 12 on the outside surface of the cylinder. The housing has an inside surface 36 defining a flow path. The flow path has a longitudinal axis. The inside surface of the housing forms a generally circumferentially extending annular recess 16. The turbine wheel is mounted in the housing for rotation around the longitudinal axis of the flow path. The turbine wheel comprises a hub 30 positioned on the longitudinal axis, a ring 14 positioned in the annular recess, a plurality of radially extending turbine blades 10 connecting the hub with the ring, and plurality of magnets 20 carried by the ring. The cylinder is mounted on an outside surface 38 of the housing for rotation around the longitudinal axis of the flow path. The cylinder carries a plurality of magnets 18 which are magnetically coupled to the plurality of magnets carried by the ring. The visually observable pattern 12 on the outside surface of the cylinder permits rotation of the cylinder to be visually ascertained.

The housing preferably comprises an upstream housing half 22 and a downstream housing half 24. A portion of the inside surface of the upstream housing half defines a diverging a flow path 26, and a portion of the inside surface of the downstream housing half defines a converging flow path 28. A portion of the inside surface of the upstream housing half extends generally radially outwardly to define a first generally annular wall 40 and a portion of the inside surface of the downstream housing half extends generally radially outwardly to define a second generally annular wall 42. The generally circumferentially extending annular recess 16 is defined between the first generally annular wall and the second generally annular wall. The housing is preferably constructed of a nonmagnetic material. Nonmagnetic stainless steel, for example 316SS/316L containing less than 2% zinc has been used with good results, although other nonmagnetic materials, such as aluminum or structural plastics, are expected to also be useful. The housing halves will generally come together at one of the annular walls. In the illustrated embodiment, the halves come together at the downstream annular wall, the downstream housing half threading into the upstream housing half.

The ring 14 preferably has a rectangularly shaped longitudinal cross section and is sized to fit in the annular recess. An inner diameter of the ring is near the same as an outlet diameter of the diverging section to avoid significant flow restriction.

Figure 1:
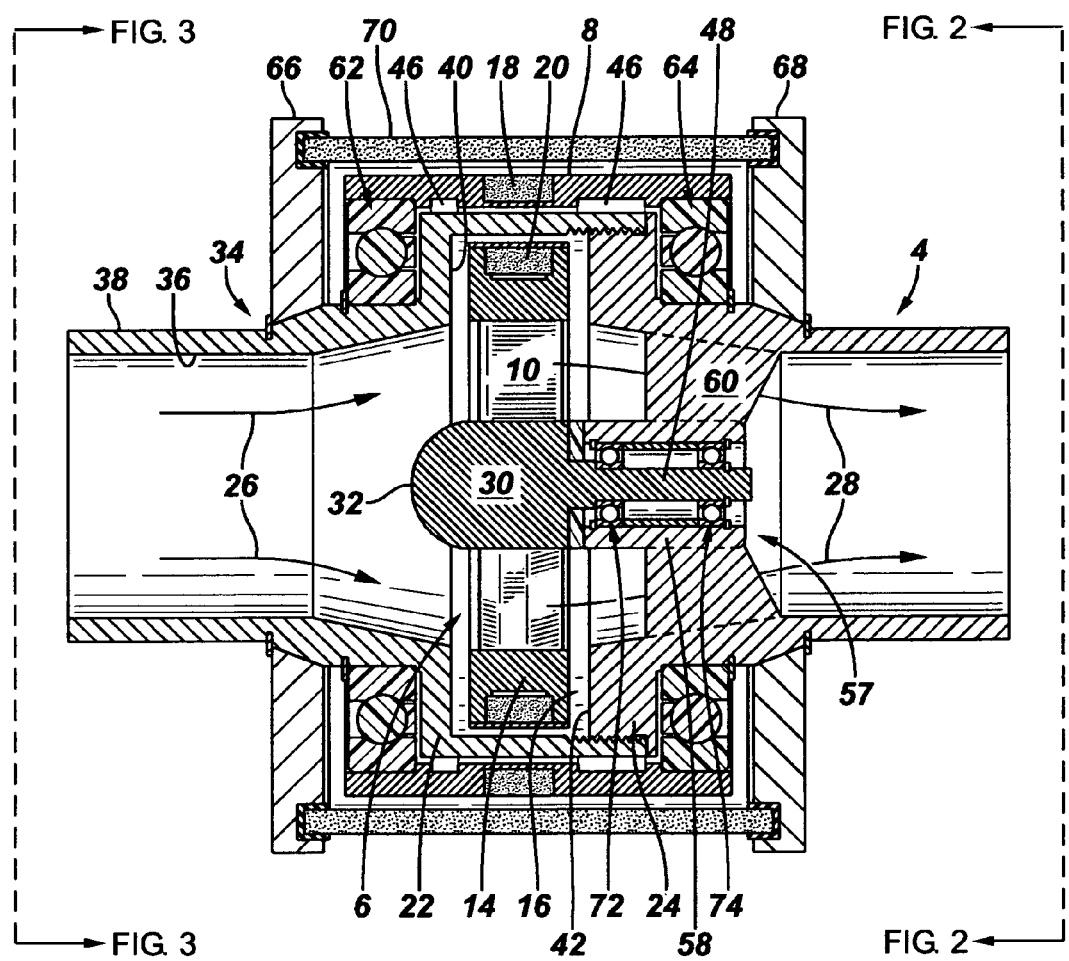
FIG. 1 is a cross sectional view of a flow indicator device according to one embodiment of the invention.

To hold down weight, and reduce the forces required to set the indicator into motion, and overcome inertial forces, circumferentially extending grooves 44 (FIG. 5) are formed in an outer surface of the ring and circumferentially extending annular recesses 46 (FIG. 1) are formed on an inner surface of the cylinder. The cylinder is preferably constructed of a low density, preferably nonmagnetic material, such aluminum or structural plastic. The turbine wheel can be constructed of the same material as the housing. If desired, the turbine ring can carry a nonmagnetic circumferential band to more reliably retain the magnets and better streamline fluid flow around the outer edge of the wheel.

The hub 30 has an upstream end and a downstream end. A streamlined flow nose cone body 32 preferably extends from the upstream end of the hub and an axial shaft 48 extends from the downstream end of the hub.

Figure 7:
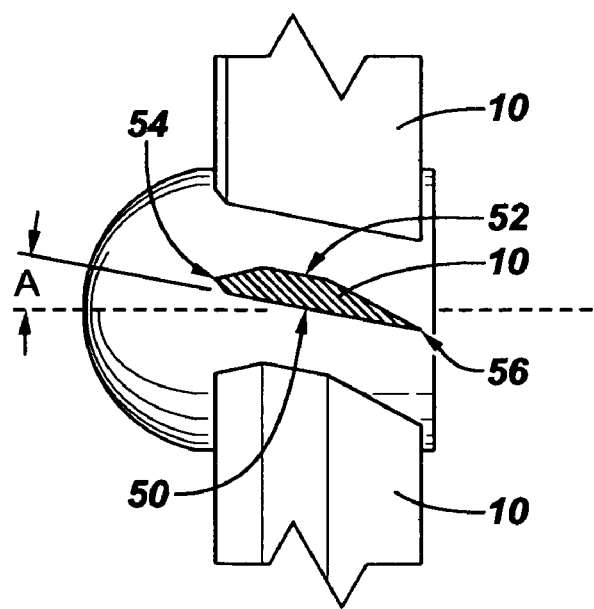
FIG. 7 is a view of a portion of the element shown in FIGS. 4 and 5 taken partly in cross section.

The plurality of turbine blades 10 can be from 6 to 32 in number, generally from 8 to 16 in number. Preferably, each turbine blade having an airfoil-shaped cross section, when viewed perpendicular to the fluid flow path, and is set at an acute angle A with respect to the fluid flow so as to cause the turbine wheel to spin from flow of fluid along the flow path. (See FIG. 7). Angle A is generally selected between 3 to 30 degrees, usually between 5 and 20 degrees. Each turbine blade is preferably flattened and has a flat face 50 on an upstream facing side and a humped face 52 on a downstream facing side. The humped face is longer as measured in a direction of fluid flow than the flat face, providing increased lift to spin the wheel. A line extending from a leading edge 54 of each blade to a trailing edge 56 of each blade is contained within the blade. A trailing section of each blade is more streamlined than a leading section.

The invention preferably employs only a single mounting means 57 to mount the turbine wheel. The mounting means is positioned downstream from the turbine wheel. The mounting means extends from an inside wall of the converging section and is for rotatably mounting the shaft extending from the downstream end of the hub. The mounting means comprises an axially extending portion 58 defining a borehole for positioning the shaft and a plurality of webbing plates 60 extending radially outwardly from the axial portion to locate the axial portion of the mounting means along the axis of the flow path. Preferably, the downstream housing half and the mounting means are of integrally cast construction to reduce production costs and increase reliability.

Preferably, the plurality of magnets carried by the cylinder are each generally cylindrical and are positioned in radial boreholes extending partway though the cylinder wall from an outside surface thereof. See FIG. 1. The plurality of magnets carried by the ring are each also generally cylindrical and are positioned in radial boreholes extending partway though the ring from the outside surface thereof. The radial boreholes in the cylinder and in the turbine wheel are in alignment with each other and the magnets are positioned in the boreholes with the inwardly-facing magnetic poles of the magnets carried by the cylinder being opposite from the outwardly-facing magnetic poles of the magnets carried by the turbine wheel, so as to magnetically couple the cylinder to the turbine wheel. The magnets are preferably rare earth-containing magnets, such as neodymium-iron-boron, although other, less-powerful magnets could also be employed.

In the illustrated embodiment, the cylinder has an upstream end and a downstream end. An upstream bearing 62 assembly rotatably mounts the upstream end of the cylinder to an outer surface of the upstream housing half. A downstream bearing assembly 64 rotatably mounts the downstream end of the cylinder to the outer surface of the downstream housing. The bearing assemblies are preferably low friction, low load bearings, generally formed from Teflon, Delrin or the like.

An upstream collar 66 is mounted to the outer surface of the upstream housing half upstream of the upstream bearing. A downstream collar 68 is mounted to the outer surface of the downstream housing half downstream of the downstream bearing. A transparent cylindrical globe 70 is mounted between the upstream collar and the downstream collar in covering relationship with the outer surface of the cylinder.

An upstream bearing 72 and a downstream bearing 74 are preferably carried in the borehole in the mounting means for mounting the turbine shaft.

If desired, a radially outwardly extending upstream end flange 76 can be positioned at an upstream end of the upstream housing half, and radially outwardly extending downstream end flange 78 positioned at a downstream end of the downstream housing half. Or the device can simply be welded into the piping at the desired point.

A further embodiment of the invention provides an improved method for providing a visual indication of a flow of fluid through an opaque hard walled tube. The improvement is applicable to a method wherein a turbine wheel having a plurality of turbine blades is positioned in the tube for rotation alongside an inside wall of the tube. A cylinder is positioned on the outside of the tube for rotation alongside an outside wall of the tube. The cylinder is magnetically coupled to the turbine wheel through the sidewall of the tube so that rotation of the turbine wheel causes rotation of the cylinder. A visually observable pattern is provided on the outside surface of the cylinder so that rotation of the cylinder can be visually ascertained. The improvement comprises flowing the fluid through a diverging section of the tube just prior to flowing the fluid through the turbine wheel. This aspect of the method reduces pressure drop in the fluid. It is applicable to liquids or gases. Liquid use is preferred, since it has been tested with good results.

Preferably, the method further comprises providing a ring around an outer periphery of the turbine wheel. The ring carries generally radially disposed magnets in generally radially oriented boreholes extending from its outermost surface. The turbine wheel is positioned in an enlarged section of the tube. This aspect of the method facilitates coupling the turbine to the cylinder as it permits the use of larger magnets without a concomitant increase in pressure drop.

Preferably, the method further comprises recessing the ring into an inner sidewall of the flow passage, providing a streamlined nose cone on an upstream end of the turbine wheel, and providing the turbine blades with an airfoil configuration in cross-section. Each of these features alone or in combination reduce turbulence in operation of the device.

While certain preferred embodiments of the invention have been described and claimed herein, the invention is not to be construed as being so limited, except to the extent that such limitations are found in the claims.

What is claimed is:

1. In an apparatus for providing a visual indication of a flow of fluid through an opaque hard walled tube, said apparatus comprising a tube defining a flow path, a turbine wheel mounted in the tube for rotation alongside an inside wall of the tube, said turbine wheel having a plurality of turbine blades, a cylinder mounted outside the tube for rotation alongside an outside wall of the tube, said cylinder being magnetically coupled to the turbine wheel through the sidewall of the tube so that rotation of the turbine wheel causes rotation of the cylinder,
a plurality of magnets being mounted to the cylinder,
and a visually observable pattern on an outside surface of the cylinder so that rotation of the cylinder can be visually ascertained, the improvement comprising
a ring mounted peripherally around the plurality of turbine blades and forming a part of the turbine wheel,
a plurality of magnets mounted to the ring,
wherein the magnets are mounted to the ring and to the cylinder so as to magnetically couple the turbine wheel to the cylinder, and
an annular recess formed in an inner wall of the tube for receiving the ring.

2. In an apparatus as in claim 1, the improvement further comprising an upstream housing half and a downstream housing half coming together to form the tube and define the annular recess.

3. In an apparatus as in claim 2, the improvement further comprising a diverging flow path formed by a portion of an inside surface of the upstream housing half and a converging flow path formed by a portion of an inside surface of the downstream housing half, the turbine wheel being positioned between the diverging flow path and the converging flow path, wherein the converging flow path converges at a half-angle of convergence, and the diverging flow path diverges at a half-angle of divergence, said half-angles as measured between the tube axis and the wall being generally from 3 to 30 degrees.

4. In an apparatus as in claim 3, said apparatus further comprising a hub forming a part of the turbine wheel and having a longitudinal axis positioned along the longitudinal axis of the tube, said hub having an upstream end and a downstream end, the plurality of turbine blades extending radially outwardly from the hub, the improvement further comprising
a nose cone element positioned on the upstream end of the hub, said nose cone element being integral with the hub.

5. Apparatus for providing a visual indication of a flow of fluid through an opaque hard walled tube, said apparatus comprising:
a housing having an inside surface defining a flow path, said flow path having a longitudinal axis, the inside surface of the housing forming a generally circumferentially extending annular recess,
a turbine wheel mounted in the housing for rotation around the longitudinal axis of the flow path, said turbine wheel comprising a hub positioned on the longitudinal axis, a ring positioned in the annular recess, a plurality of radially extending turbine blades connecting the hub with the ring, and a plurality of magnets carried by the ring,
a cylinder mounted on an outside surface of the housing for rotation around the longitudinal axis of the flow path, said cylinder carrying a plurality of magnets which are magnetically coupled to the plurality of magnets carried by the ring, and
a visually observable pattern on an outside surface of the cylinder so that rotation of the cylinder can be visually ascertained.

6. Apparatus as in claim 5 wherein the housing comprises an upstream housing half and a downstream housing half, a portion of the inside surface of the upstream housing half defining a diverging a flow path, and a portion of the inside surface of the downstream housing half defining a converging flow path.

7. Apparatus as in claim 6 wherein a portion of the inside surface of the upstream housing half extends generally radially outwardly to define a first generally annular wall and a portion of the inside surface of the downstream housing half extends generally radially outwardly to define a second generally annular wall, the generally circumferentially extending annular recess being defined between the first generally annular wall and the second generally annular wall.

8. Apparatus as in claim 7 wherein the ring has a rectangularly shaped longitudinal cross section and is sized to fit in the annular recess and an inner diameter of the ring is near the same as an outlet diameter of the diverging section.

9. Apparatus as in claim 8 wherein circumferentially extending grooves are formed in an outer surface of the ring and circumferentially extending annular recesses are formed on an inner surface of the cylinder.

10. Apparatus as in claim 8 wherein the hub has an upstream end and a downstream end, said apparatus further comprising a streamlined flow nose cone element extending from the upstream end of the hub and an axial shaft extending from the downstream end of the hub, said nose cone element and said axial shaft being integral with the hub.

11. Apparatus as in claim 8 wherein the plurality of turbine blades is from 6 to 32 in number, each turbine blade having an airfoil-shaped cross section, when viewed perpendicular to the fluid flow path, and being set at an acute angle with respect to the fluid flow so as to cause the turbine wheel to spin from flow of fluid along the flow path.

12. Apparatus as in claim 11 wherein each turbine blade is flattened and has a flat face on an upstream facing side and a humped face on a downstream facing side, the humped face being longer as measured in a direction of fluid flow than the flat face, a line extending from a leading edge of each blade to a trailing edge of each blade being contained within the turbine blade, a trailing section of each blade being more streamlined than a leading section.

13. Apparatus as in 11 further comprising a mounting means extending from an inside wall of the converging section for rotatably mounting the shaft extending from the downstream end of the hub.

14. Apparatus as in claim 13 the mounting means has an axially extending portion defining a borehole for positioning the shaft and a plurality of webbing plates extending radially outwardly from the axial portion to locate the axial portion of the mounting means along the axis of the flow path.

15. Apparatus as in claim 11 wherein the cylinder has an upstream end and a downstream end, said apparatus further comprising
   an upstream bearing assembly rotatably mounting the upstream end of the cylinder to an outer surface of the upstream housing half
   a downstream bearing assembly rotatably mounting the downstream end of the cylinder to the outer surface of the downstream housing,
   an upstream collar mounted to an outside wall of the upstream housing half upstream of the upstream bearing,
   a downstream collar mounted to the outside wall of the upstream housing half downstream of the downstream bearing,
   a transparent cylindrical globe mounted between the upstream collar and the downstream collar in covering relationship with the outer surface of the cylinder,
   an upstream bearing and a downstream bearing carried by the borehole in the mounting means for mounting the turbine shaft;
   a radially outwardly extending upstream end flange positioned at an upstream end of the upstream housing half, and
   a radially outwardly extending downstream end flange positioned at a downstream end of the downstream housing half.

16. Apparatus as in claim 8 wherein
   a plurality of magnets carried by the cylinder are generally cylindrical and are positioned in radial boreholes extending partway though the cylinder wall from an outside surface thereof, and
   the plurality of magnets carried by the ring are each generally cylindrical and are positioned in radial boreholes extending partway though the ring from the outside surface thereof,
   the radial boreholes in the cylinder and in the turbine wheel being in alignment with each other and the magnets being positioned in the boreholes with the inwardly-facing magnetic poles of the magnets carried by the cylinder being opposite from the outwardly-facing magnetic poles of the magnets carried by the turbine wheel, so as to magnetically couple the cylinder to the turbine wheel.

17. In a method for providing a visual indication of a flow of fluid through an opaque hard walled tube comprising positioning a turbine wheel having a plurality of turbine blades in the tube for rotation alongside an inside wall of the tube,
   positioning a cylinder on the outside of the tube for rotation alongside an outside wall of the tube, said cylinder being magnetically coupled to the turbine wheel through the sidewall of the tube so that rotation of the turbine wheel causes rotation of the cylinder, and
   providing a visually observable pattern on the outside surface of the cylinder so that rotation of the cylinder can be visually ascertained,
   the improvement comprising
   flowing the fluid through a diverging section of tubing just prior to flowing said fluid through the turbine wheel, said tubing diverging at a half-angle of divergence, as measured between a tube axis and the inside wall of the tube, in the range of from 3 to 30 degrees, wherein the turbine wheel is positioned in an enlarged section of the tube.

18. A method as in claim 17, wherein the improvement further comprises
   providing a ring around an outer periphery of the turbine wheel, said ring carrying generally radially disposed magnets in generally radially oriented boreholes extending from an outer surface thereof.

19. A method as in claim 18, wherein the improvement further comprises
   recessing the ring into an inner sidewall of the flow passage,
   providing a streamlined flow nose cone on an upstream end of the turbine wheel, said streamlined flow nose cone element being integral with the turbine wheel, and
   providing the turbine blades with an airfoil configuration in cross-section.

* * * * *